(12) United States Patent
Hu et al.

(10) Patent No.: US 10,706,530 B2
(45) Date of Patent: Jul. 7, 2020

(54) OBJECT DETECTION

(71) Applicant: INTERNATIONAL BUSINESS MACHINES CORPORATION, Armonk, NY (US)

(72) Inventors: Guo Qiang Hu, Shanghai (CN); Jing Chang Huang, Shanghai (CN); Jun Chi Yan, Shanghai (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/700,684

(22) Filed: Sep. 11, 2017

(65) Prior Publication Data

US 2019/0080444 A1   Mar. 14, 2019

(51) Int. Cl.
*G06K 9/00* (2006.01)
*G06T 7/00* (2017.01)
*G06K 9/32* (2006.01)
*G06K 9/62* (2006.01)
*G06T 7/73* (2017.01)

(52) U.S. Cl.
CPC ............ *G06T 7/001* (2013.01); *G06K 9/3233* (2013.01); *G06K 9/6202* (2013.01); *G06K 9/6254* (2013.01); *G06K 9/6256* (2013.01); *G06T 7/74* (2017.01); *G06T 2207/20081* (2013.01); *G06T 2207/20104* (2013.01)

(58) Field of Classification Search
CPC .......... G06T 7/001; G06T 2207/20081; G06T 2207/20104; G06T 7/32; G06T 7/337; G06K 9/4633; G06K 9/00208; G06K 9/6255; G06K 9/3233; G06K 9/6202; G06K 9/6256

See application file for complete search history.

(56) References Cited

U.S. PATENT DOCUMENTS 6,266,442 B1   7/2001   Laumeyer et al.
8,965,134 B2   2/2015   Kompalli et al.
(Continued)

OTHER PUBLICATIONS

Mell et al., "The NIST Definition of Cloud Computing," U.S. Department of Commerce, National Institute of Standards and Technology, Sep. 2011, p. 1-7, Special Publication 800-145.
Felzenszwalb et al., "Object Detection with Discriminatively Trained Part-Based Models", IEEE Transactions on Pattern Analysis and Machine Intelligence, vol. 32, No. 9, Sep. 2010, pp. 1627-1645.
(Continued)

*Primary Examiner* — Ian L Lemieux
(74) *Attorney, Agent, or Firm* — Robert D. Bean

(57) ABSTRACT

This disclosure provides a method for object detection. The method comprises receiving a user input that specifies one or more first regions and one or more second regions in a template image. The one or more second regions include one or more objects of interest. The method further comprises for each of the one or more first regions discovering a third region in an image under detection corresponding to the first region in the template image by matching the image under detection with the template image. The method further comprises computing a transformation function based on the matching from each of the one or more first regions to its corresponding third region. The method further comprises applying the computed transformation function to the one or more second regions to localize one or more fourth regions in the image under detection for the object detection.

20 Claims, 7 Drawing Sheets

(56) References Cited

U.S. PATENT DOCUMENTS

| | | | | |
|---|---|---|---|---|
| 8,995,715 | B2* | 3/2015 | Sultana | G06K 9/00228 382/103 |
| 9,245,201 | B1* | 1/2016 | Jin | G06K 9/6202 |
| 9,349,076 | B1 | 5/2016 | Liu et al. | |
| 9,477,886 | B2 | 10/2016 | Ghessassi | |
| 9,508,151 | B2 | 11/2016 | Romanik et al. | |
| 2009/0028397 | A1* | 1/2009 | Makram-Ebeid | G06T 7/33 382/128 |
| 2009/0324107 | A1* | 12/2009 | Walch | G06K 9/00872 382/224 |
| 2011/0243477 | A1* | 10/2011 | Minerich | G06K 9/3275 382/294 |
| 2012/0314974 | A1* | 12/2012 | Yang | G06K 9/6211 382/294 |
| 2014/0003717 | A1* | 1/2014 | Brito | G06K 9/00449 382/170 |
| 2014/0254940 | A1* | 9/2014 | Shiiyama | G06K 9/4671 382/201 |
| 2014/0281910 | A1 | 9/2014 | Ghessassi | |
| 2015/0109418 | A1 | 4/2015 | Lin | |
| 2015/0169998 | A1* | 6/2015 | Rabinovich | G06K 9/6218 382/159 |
| 2016/0012595 | A1 | 1/2016 | Romanik et al. | |
| 2016/0210525 | A1 | 7/2016 | Yang et al. | |
| 2017/0109605 | A1* | 4/2017 | Ahn | G06N 3/0454 |
| 2018/0197285 | A1* | 7/2018 | Vinciguerra | G06T 7/90 |
| 2019/0213724 | A1 | 7/2019 | Avrahami et al. | |
| 2020/0005078 | A1* | 1/2020 | Tambo | G06K 9/6215 |

OTHER PUBLICATIONS

Liu et al., "SSD: Single Shot MultiBox Detector", ECCV 2016, Part I, LNCS 9905, pp. 21-37, 2016 (best date available), pp. 1-18.

Ren et al., "Faster R-CNN: Towards Real-Time Object Detection with Region Proposal Networks", IEEE Transactions on Pattern Analysis and Machine Intelligence, vol. 39, No. 6, Jun. 2017, pp. 1137-1149.

Sarkar, "Learning Image Anchor Templates for Document Classification and Data Extraction", 2010 20th International Conference on Pattern Recognition (ICPR), Aug. 23-26, 2010, Istanbul, Turkey, pp. 3428-3431.

Yan et al., "Multi-View Point Registration via Alternating Optimization", Proceedings of the Twenty-Ninth AAAI Conference on Artificial Intelligence, Austin, Texas, USA, Jan. 25-30, 2015, pp. 3834-3840.

Lampert et al., "Beyond sliding windows: Object localization by efficient subwindow search", IEEE Conference on Computer Vision and Pattern Recognition, 2008, (CVPR 2008), Jun. 23-28, 2008, Anchorage, AK, USA, pp. 1-8.

Yan et al., "Adaptive Discrete Hypergraph Matching", IEEE Transactions on Cybernetics, vol. PP, Issue: 99, Feb. 17, 2017, pp. 1-15.

IBM: List of IBM Patents or Patent Applications Treated as Related (Appendix P), Mar. 9, 2018, pp. 1-2.

IBM, List of IBM Patents or Patent Applications Treated as Related, Appendix P, Apr. 15, 2019, 2 pages.

Hu et al., Pending U.S. Appl. No. 16/382,840, filed Apr. 12, 2019, Entitled "Object Detection", 30 pages.

* cited by examiner

OBJECT DETECTION

BACKGROUND

The present invention relates to image processing, and more specifically, to a method, a system and a computer program product for visual object detection.

Nowadays, in many fields, especially in the manufacturing field, there is a fast growing visual inspection automation demand. For example, when a smartphone part, published circuit board (PCB) product, liquid crystal display (LCD) panel, or wafer is manufactured, or when a car has finished being painted, an image of the product is captured and a defect inspection is performed on the captured image automatically. This automatic inspection improves the efficiency of finding defective products.

In the captured image, it is desirable to detect or localize a region of interest (ROI), which includes an object for which an analysis is to be performed, to better determine if there is a defect. The ROI to detect may be volatile for its appearance, and therefore typically a further classifier is needed for fine-grained recognition of the object inside the ROI. It is necessary to first localize the target ROI in order to perform further analysis such as classification via deep learning.

Currently, for detection of a ROI in an image, various methods for object detection via machine learning are proposed, such as Fast Region-based Convolutional Neural Networks (Faster-RCNN), Discriminatively Trained Part Based Models (DPM), Single Shot MultiBox Detector (SSD), et cetera. For the methods involving machine learning, labeled image data is required to train the detectors. If the ROI is small while the captured image is big, the search space will be big. Another method for detecting a ROI is classic template matching. Since defective areas may vary in appearance due to deformation or transformation, detection is made more difficult for both the template matching method and the machine learning method.

SUMMARY

In this disclosure, a method, a system and a computer program product for object detection are proposed.

According to one embodiment of the present invention, there is provided a method for object detection. The method comprises receiving a user input that specifies first regions and second regions in a template image. The second regions include objects of interest. The method further comprises for each of the first regions discovering a third region in an image under detection corresponding to the first region in the template image by matching the image under detection with the template image. The method further comprises computing a transformation function based on the matching from each of the first regions to its corresponding third region. The method further comprises applying the computed transformation function to the second regions to localize the fourth regions in the image under detection for the object detection.

According to another embodiment of the present invention, there is provided a system for object detection. The system comprises one or more processors and a memory coupled to at least one of the processors. The system comprises a set of computer program instructions stored in the memory and executed by at least one of the processors in order to perform the action of receiving a user input that specifies first regions and second regions within a template image. The second regions include objects of interest. The system further comprises a set of computer program instructions stored in the memory and executed by at least one of the processors in order to perform the action of, for each of the first regions, discovering a third region in an image under detection corresponding to the first region in the template image by matching the image under detection with the template image. The system further comprises a set of computer program instructions stored in the memory and executed by at least one of the processors in order to perform action of computing a transformation function based on the matching from each of the first regions to its corresponding third region. The system further comprises a set of computer program instructions stored in the memory and executed by at least one of the processors in order to perform action of applying the computed transformation function to the second regions to localize fourth regions in the image under detection for the object detection.

According to a further embodiment of the present invention, there is provided a computer program product for object detection. The computer program product comprises a computer readable storage medium having program instructions embodied therewith. The program instructions being executable by a device to cause the device to perform a method. The method comprises receiving a user input that specifies first regions and second regions in a template image. The second regions include objects of interest. The method further comprises for each of the first regions discovering a third region in an image under detection corresponding to the first region in the template image by matching the image under detection with the template image. The method further comprises computing a transformation function based on the matching from each of the first regions to its corresponding third region. The method further comprises applying the computed transformation function to the second regions to localize fourth regions in the image under detection for the object detection.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
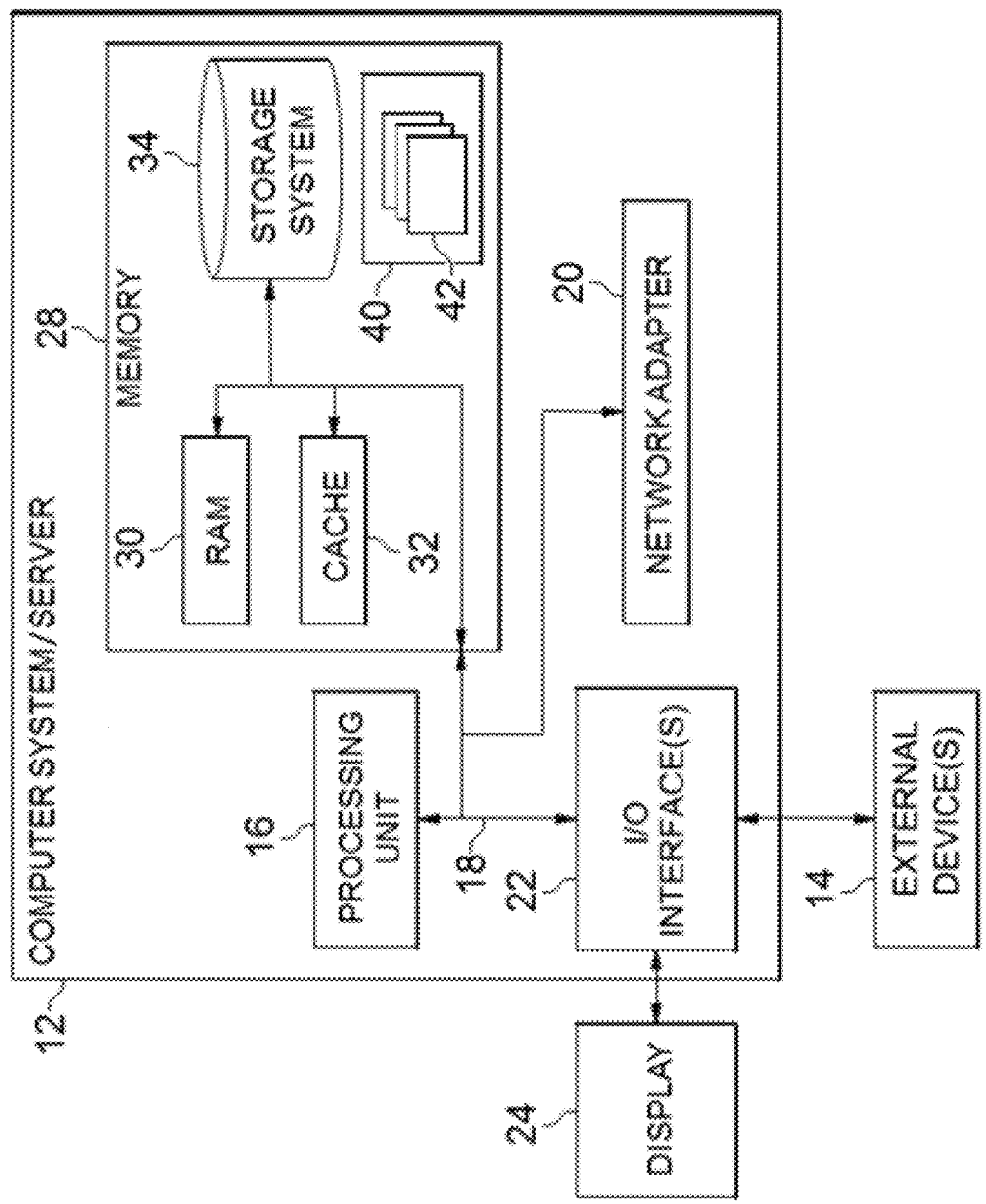
FIG. 1 shows an exemplary computer system which is capable of implementing embodiments of the present invention.

Referring now to FIG. 1, in which an exemplary computer system/server 12 capable of implementing embodiments of the present invention is shown. FIG. 1 is also depicts an illustrative example of a portable electronic device such as a communication device which is capable of implementing embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2A:
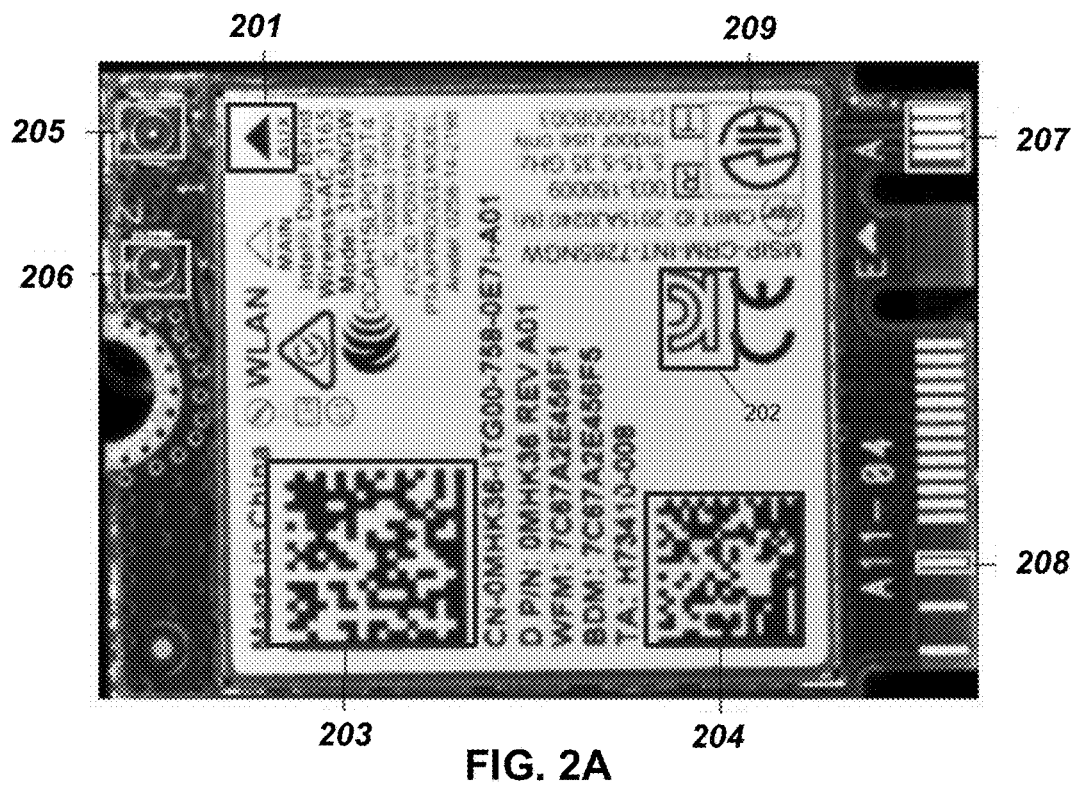
FIG. 2A shows an image of a published circuit board (PCB) that is manufactured in such a way as to exemplify elements of the present invention.
Figure 3:
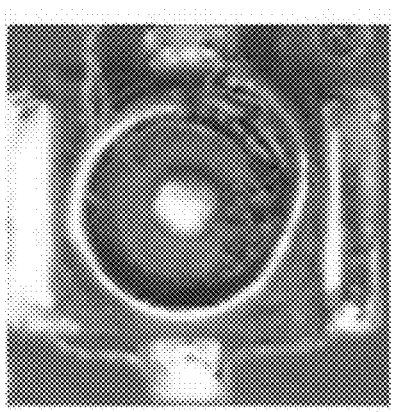
FIG. 3 shows several exemplary appearances of antenna connectors in images of manufactured PCBs.
Figure 3:
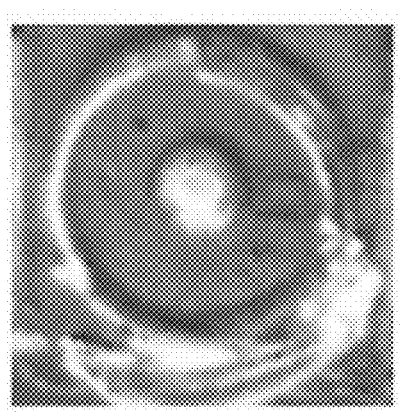
Figure 3:
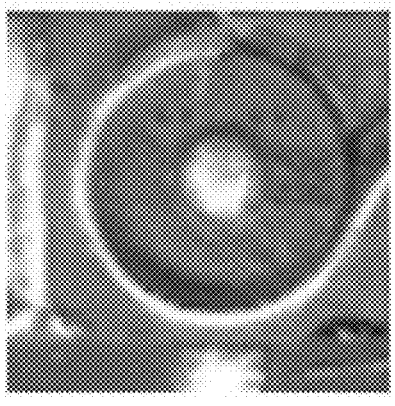
Figure 3:
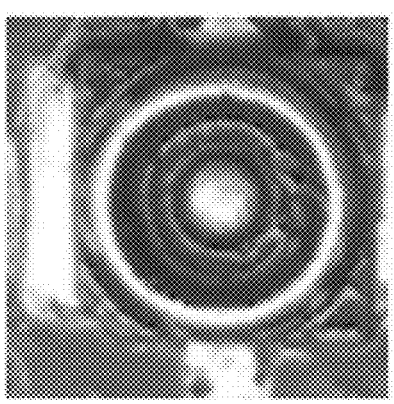
Figure 3:
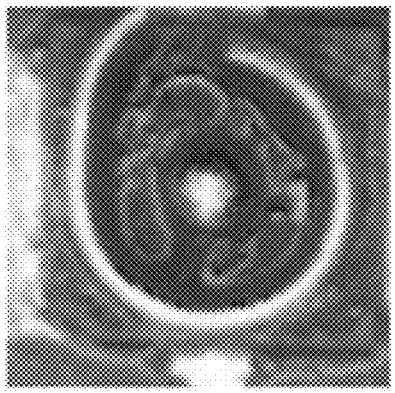
Figure 3:
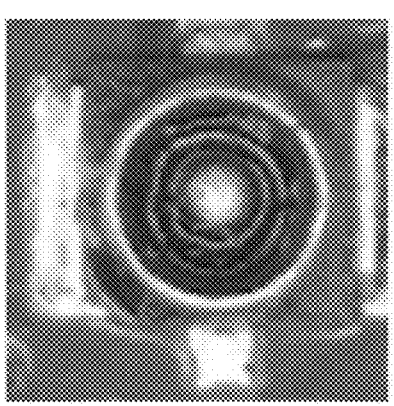

With reference now to FIG. 2A, FIG. 2A shows an image of a PCB that is manufactured in such a way as to exemplify elements of the present invention. In FIG. 2A, for example, the regions 205 and 206 indicated by rectangles include antenna connectors. It is difficult if program 40 directly matches an antenna connector in a captured image. FIG. 3 shows several exemplary appearances of antenna connectors in images of actually manufactured PCBs. It can be seen that the ROIs including the target ROI (i.e., antenna connector) have appearances with heavy variations, which makes matching more difficult, whether by machine learning or by template matching.

The heavy variations in appearance are caused by at least one of deformation, transformation, and occlusion. The deformation means alteration in the shape or dimensions of an object. The transformation means a function that changes the position, direction or scale of a coordinate system. The occlusion means blocking of at least a part of an object. All of these common situations will make the direct matching of ROIs difficult.

Additionally, for the methods involving machine learning, its search space is the whole image. In the example shown in FIG. 2A, the amount of calculation is huge when the task is to find a small ROI such as 205 and 206 in a big image as shown in FIG. 2A. For training the models, a large number of labeled images are needed. However, for a specific product, a sufficient amount of labeled images may not be available.

Thus, the present invention proposed to firstly find auxiliary regions or point sets that are easily matched, then to use them to localize target ROIs.

The application of this invention is based on the assumption that the captured images are from a plane of a product. The application of this invention is also based on the assumption that objects in the images are all rigid objects and the local and global transformation is roughly the same to all objects in one image. The application of this invention is also based on the assumption that compared to the ROI, there are other regions, which are more distinctive to match.

Figure 4:
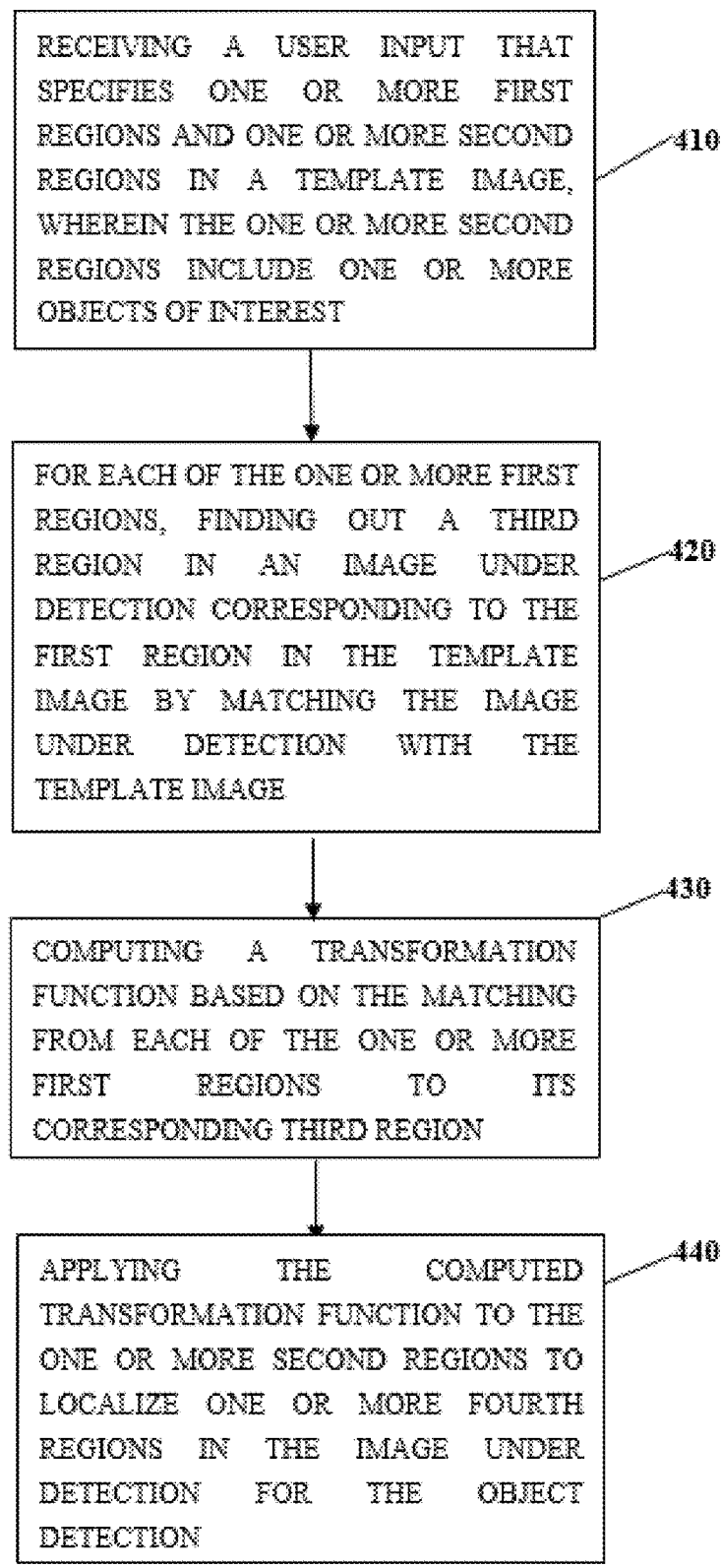
FIG. 4 is a flowchart illustrating a method for visual object detection according to an embodiment of the present invention.

With reference now to FIG. 4, FIG. 4 is a flowchart illustrating a method for object detection according to an embodiment of the present invention. As shown in FIG. 4, the method for visual object detection includes a region specifying step 410, a region matching step 420, a transformation function computation step 430, and a transformation application step 440. In one embodiment of the invention, the method in FIG. 4 is performed in the computer system/server 12 in FIG. 1. In one embodiment of the invention, the method in FIG. 4 is performed to each of the images under detection.

Specifically, in the region specifying step 410, a user input is received, which specifies one or more first regions and one or more second regions in a template image. The one or more second regions may include one or more objects of interest. Here, the template image is one selected image including a clear well manufactured product with a standard orientation. For example, the image as shown in FIG. 2A is a template image in which all objects are normal and clearly captured. When a template image is given, the user may be asked to specify one or more auxiliary regions (first regions) in the template image. The auxiliary region may not include any objects of interest; however, the auxiliary region may be more distinctive than those regions including objects of interest. In FIG. 2A, regions 201-204 surrounded by dark rectangles may be specified as auxiliary regions (first regions); and regions 205-209 surrounded by shallow rectangles may be specified as ROI regions (second regions). In the ROI regions 205-209, regions 205-206 may include antenna connectors, regions 207-208 include gold fingers. All of these regions are small and less distinctive. In one example, region 209 includes a pattern that varies from batch to batch. So, these exemplary regions may not be suitable for direct matching.

Normally, an auxiliary region is specified according to user's experience if it has a salient part for matching. For example, regions 203-204 may include salient QR codes, and regions 201-202 may include invariant patterns. All of the auxiliary regions may be easier to match among images of this kind of PCBs, compared with ROI regions. FIG. 2A is only an example; the invention is not limited by FIG. 2A, and other regions may be also specified as auxiliary regions. For example, in one embodiment of the invention, the semicircular hole at the left edge of the PCB in FIG. 2A may be specified as an auxiliary region since a manufacturing defect seldom happens at this semicircular hole.

Figure 2B:
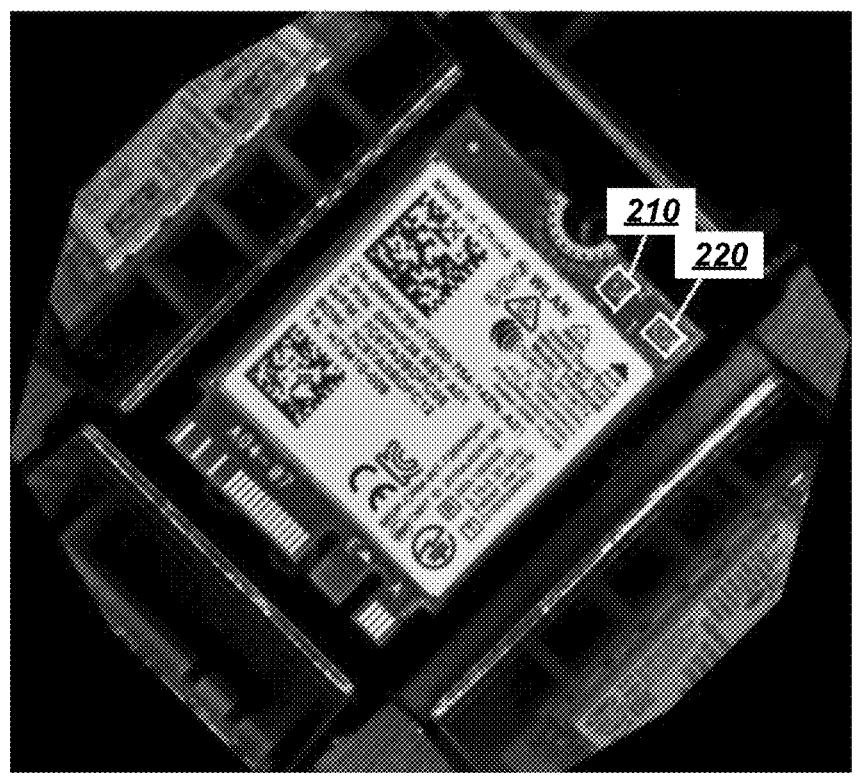
FIG. 2B shows an example of an image under detection that includes the same kind of PCB in FIG. 2A.

In the region matching step 420, for each of the one or more first regions, program 40 may find a third region in an image under detection corresponding to the first region in the template image by matching the image under detection with the template image. In one embodiment of the invention, program 40 may find the third region(s) by performing template matching via search. That is, given an auxiliary region from the template image, program 40 may discover a corresponding region (third region) in an image under detection. FIG. 2B shows an example of an image under detection that includes the same kind of PCB in FIG. 2A. Thus, the image under detection in FIG. 2B corresponds to the template image in FIG. 2A that is a base image, since both images include the same kind of PCB product. In FIG. 2B, compared with the template image in FIG. 2A, a transformation is shown to have occurred, which included translation, rotation and scaling. Despite that, in one embodiment of the invention, a known template matching method may be used by program 40 to find the corresponding third region in the image under detection.

In another embodiment of the invention, the one or more first regions may be one or more points in the template image, and a third region may be one point in the image under detection. In this embodiment, the matching may include at least one of point matching and graph matching. Program 40 may find the third region in the image under detection by graph matching or point matching or by other prior knowledge or rules. In one embodiment of the invention, a known graph matching method may be used by program 40 to find the corresponding third region. In another embodiment of the invention, a known point matching method may be used to find the corresponding third region.

As described above, the reason for matching the first region and the third region instead of directly discovering a fourth region based on the second region may be that the first region and its corresponding third region are easier to match compared with the second region and its corresponding fourth region. In other words, the first region and the third region may have fewer variations in appearance. After the region matching step 420, for each of the specified auxiliary regions (first regions) in the template image, a corresponding region (third region) may be found in the image under detection.

Then, in the transformation function computation step 430, a transformation function may be computed based on the matching from each of the one or more first regions to its corresponding third region.

Figure 5:
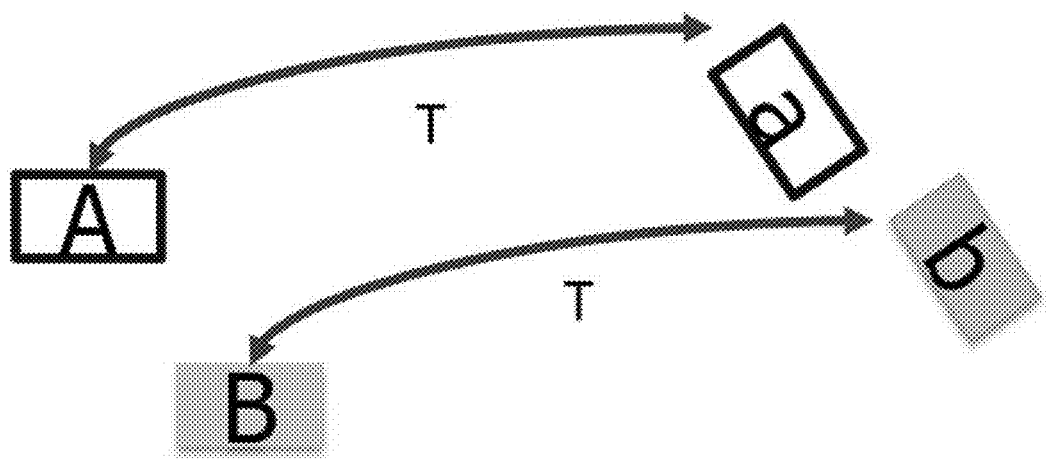
FIG. 5 shows the concept of transformation according to an embodiment of the present invention.

FIG. 5 shows concept of transformation according to an embodiment of the invention. In FIG. 5, regions A and B are from the template image, and regions a and b are from the image under detection. Specifically, the region A corresponds to an auxiliary region (first region), the region B corresponds to the target ROI (second region), the region labeled with "a" corresponds to a region (third region) in the image under detection that is matched with region A. The location of region b (fourth region) in the image under detection must yet be determined. In FIG. 5, based on the position of regions A and a, program 40 may compute a transformation function T. The transformation function T may involve at least one of translation, rotation and scaling of region a with respect to region A. Program 40 may assume that the transformation from B to b is the same as the transformation T from A to a; this assumption is true when there are only rigid objects in the images.

It is well known on how to compute a transformation function based on two corresponding regions. In the simple example in FIG. 5, program 40 may select two or more points in regions A and a to compute the transformation function T. For example, the top left point and the top right point of the rectangle of region A form a line segment L, and the top left point and the top right point of the rectangle of region A form a line segment l. Program 40 may therefore express this function as $l=T(L)$. In one embodiment of the invention, if translation from L to l is expressed as P, rotation from L to l is expressed as R, and scaling from L to l is expressed as S, then program 40 may express the function as $l=T(L)=P \cdot R \cdot S(L)$. That is, $T=P \cdot R \cdot S$. With the transformation function T, program 40 may apply the function to region B to obtain region b by using $b=T(B)$.

In a more complex example, program 40 may use more points in region A to compute the transformation function T. For example, for each pair of points (that form a line segment) in region A, program 40 may compute a function T. The computed multiple functions T may be classified into groups based on proximity, and the group with the largest number of functions T may be kept by program 40 and an average of functions T in the group may used by program 40 as the transformation function T to be applied by program 40 to region B. By employing this method, the accuracy of computation for the transformation function T may be improved.

In the example of FIG. 5, only one auxiliary region (region A) is shown. In another embodiment, a plurality of auxiliary regions may be used. In one example, for each auxiliary region, a transformation function T is computed. The computed multiple functions T are classified into groups by program 40 based on proximity, and the group with the largest number of functions T may be kept and an average of functions T in the group may be used as the transformation function T to be applied to region B by program 40. In one embodiment of the invention, even points from different auxiliary regions may be used in combination to compute a single transformation function T.

In a further embodiment, program 40 may compute a transformation function T across a plurality of auxiliary regions during the matching from each of the one or more first regions in the template image to its corresponding third region in the image under detection. In this embodiment, transformation function T may be used as an adjustable parameter in discovering the third regions for the first regions. For example, the transformation function T may be adjusted constantly until a sum of matching errors between each pair of the first and third regions reaches its minimum.

In the above embodiments, a two dimensional transformation is explained as an example. However, those skilled in the art may know that introducing 2D transformation is only for easy understanding, and the present invention also applies to a three dimensional transformation in a 3D space.

In one embodiment of the invention, computing a transformation function may include computing the transformation function based on the matching from a subset of the first regions to a corresponding subset of the third regions when the number of the first regions are larger than one. That is, not every auxiliary regions specified by the user may be used to compute the transformation function. Only a subset of auxiliary regions is automatically selected based on their fitness as an auxiliary region.

In one embodiment of the invention, the subset of the first regions (auxiliary regions) may be selected based on similarity between each of the first regions and its matched third region and/or distance between each pair of the first regions. In one example, for each of auxiliary regions in the template image, a similarity between the auxiliary region and its corresponding region in the image under detection may be computed, and only the top auxiliary regions with high similarity may be used by program 40 to compute the transformation function. In one example, the top three auxiliary regions with highest similarity from five auxiliary regions may be used for the computation by program 40. By doing so, program 40 automatically selects common salient parts between images and uses the common salient parts to compute the transformation function, which makes the method of this invention more robust as program 40 always employs salient and reliable auxiliary region(s) to obtain the transformation function.

Figure 6:
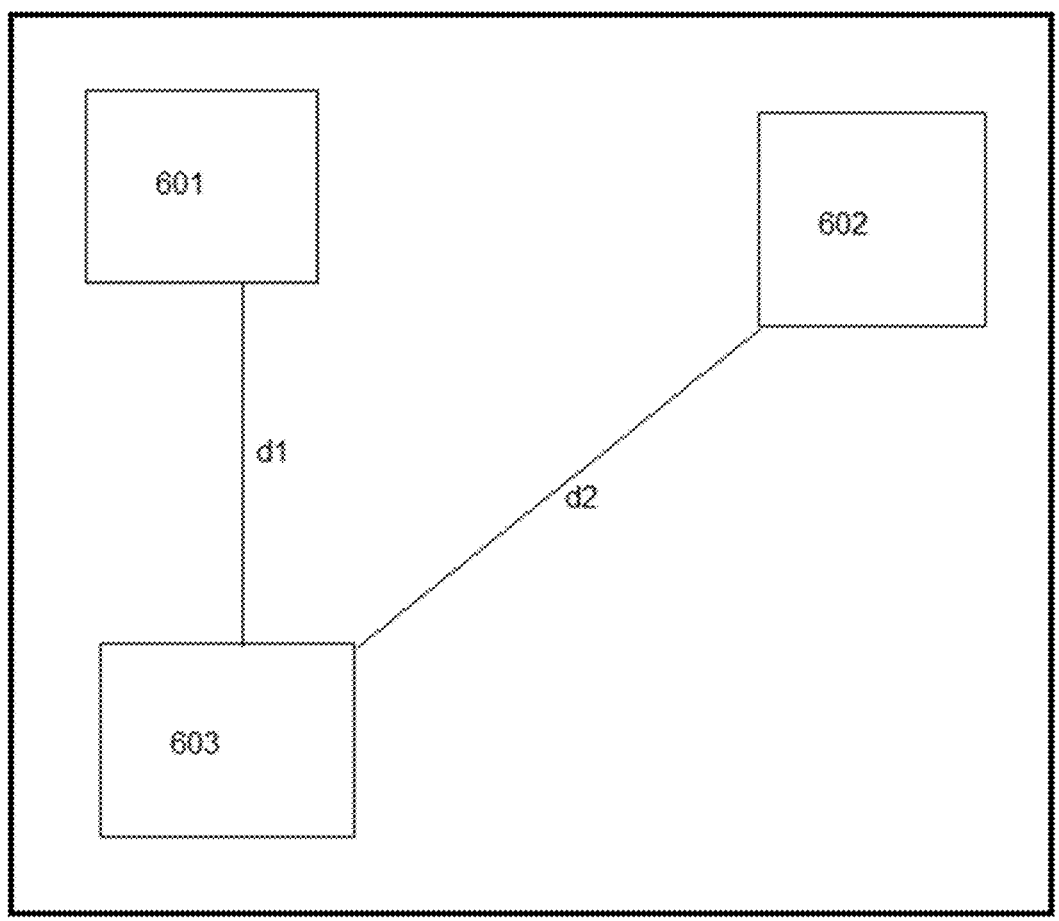
FIG. 6 shows an example of region selection considering both similarity and distance according to one embodiment of the present invention.

In one embodiment, a first region may be selected into the subset of the first regions if it has a high similarity with its matched third region and exceeds a threshold distance from other first regions. The threshold distance may be predetermined and provided to program 40 by the user or by another program or entity. In this embodiment, in addition to similarity, the distance between regions is also considered as a factor to select an auxiliary region. FIG. 6 shows an example of region selection considering both of similarity and distance according to one embodiment of the invention. In FIG. 6, there are three auxiliary regions 601-603 specified by the user in the template image. If the user specifies that only two from the three auxiliary regions will be selected, both of factors of similarity and distance may be considered as follows: for example, a simple method involves program 40 employing an objective function involving both similarity and distance to perform a selection. In one example, the objective function may be:

$$F = \text{sum\_sim} + w \cdot d$$

where sum_sim represents sum of similarities of two regions, w represents a weight parameter, and d represents distance between two regions. Thus, the two regions having a highest value of F will be selected. For example, if the similarities of regions 601-603 are 0.84, 0.72 and 0.87 respectively, distances d1 and d2 in FIG. 6 are 3 and 4 respectively, and w is 0.2. Then, for regions 601 and 603, F=(0.84+0.87)+0.2×3=2.31, and for regions 602 and 603, F=(0.72+0.87)+0.2×4=2.39. Therefore, program 40 may select regions 602 and 603 as auxiliary regions in computing the transformation function, instead of regions 601 and 602 that have the highest similarity. By doing so, program 40 may compensate for local deformation and may obtain a more reliable transformation function. The above objective function is only an example for explaining this invention, other objective functions or other means may be used as long as distances between auxiliary regions are considered in addition to similarities of auxiliary regions and corresponding regions in the image under detection in selecting appropriate auxiliary regions.

After the transformation function computation step 430, a transformation function T (such as T=P·R·S) may be obtained by program 40. In the transformation application step 440, program 40 may apply the computed transformation function to the one or more second regions to localize one or more fourth regions in the image under detection for the object detection. For example, in the example of FIG. 5, if program 40 applies the transformation function to region B in the template image, as shown by b=T(B), a region b (fourth region) may be localized in the image under detection. For example, if only regions 205-206 that include antenna connectors in FIG. 2A are specified as the target ROIs by the user, after step 430, regions 210 and 220 that also include antenna connectors may be localized in the image under detection in FIG. 2B by program 40. Further analysis may be performed on the located ROIs 210 and 220 in the subsequent processing.

The present invention focuses on a method of determining a different target for matching instead of the matching method itself. Since the auxiliary regions are easier to match compared with raw target ROIs, the method of the present invention is more efficient and more accurate for matching. One of the reasons lies in that no machine learning is needed and no manual labeling work is needed in the method of the invention. Additionally, the method of the present invention provides flexibility since the user can select multiple auxiliary regions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
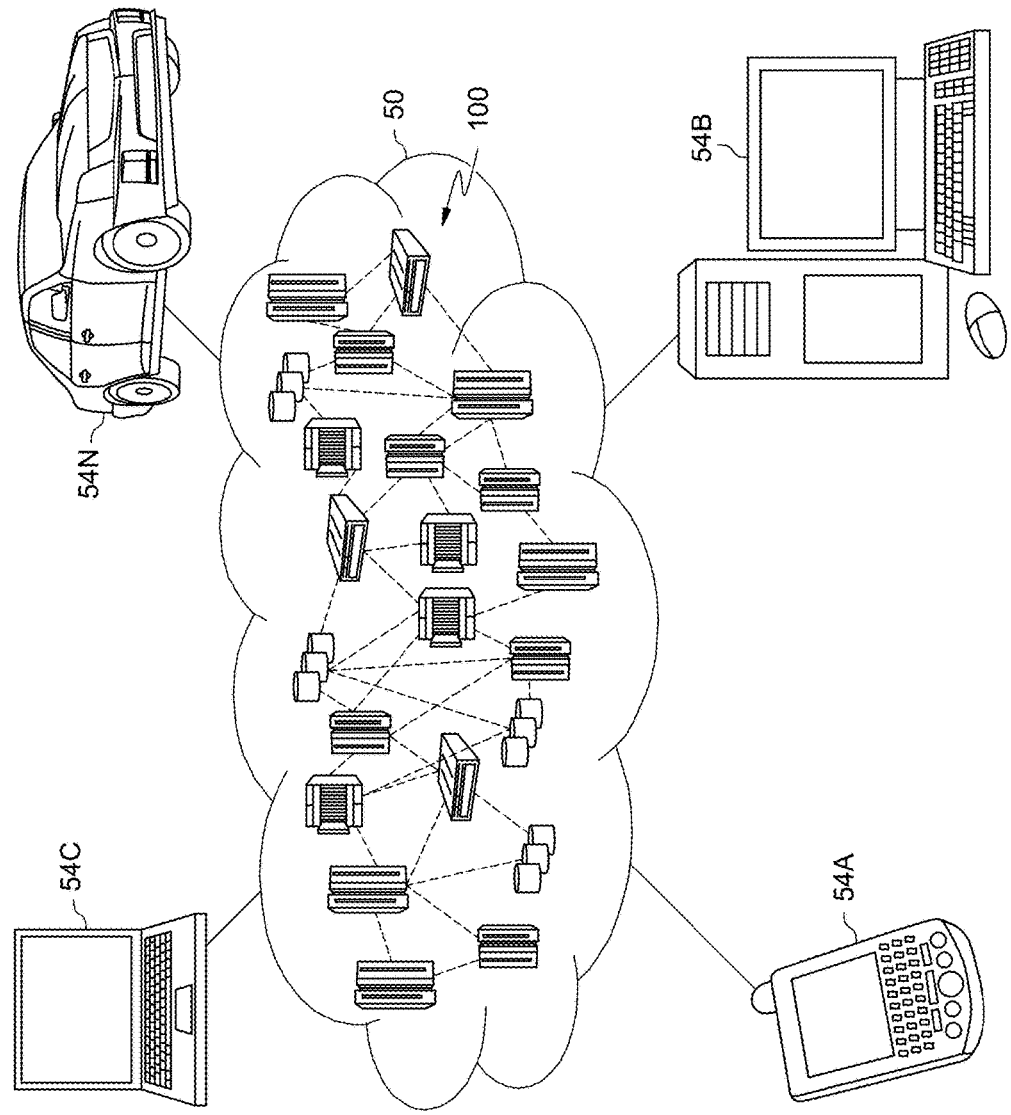
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 100 and cloud computing environment 50 can communicate with any type of computerized device over any type of network and/or network addressable connection (e.g., using a web browser).

Figure 8:
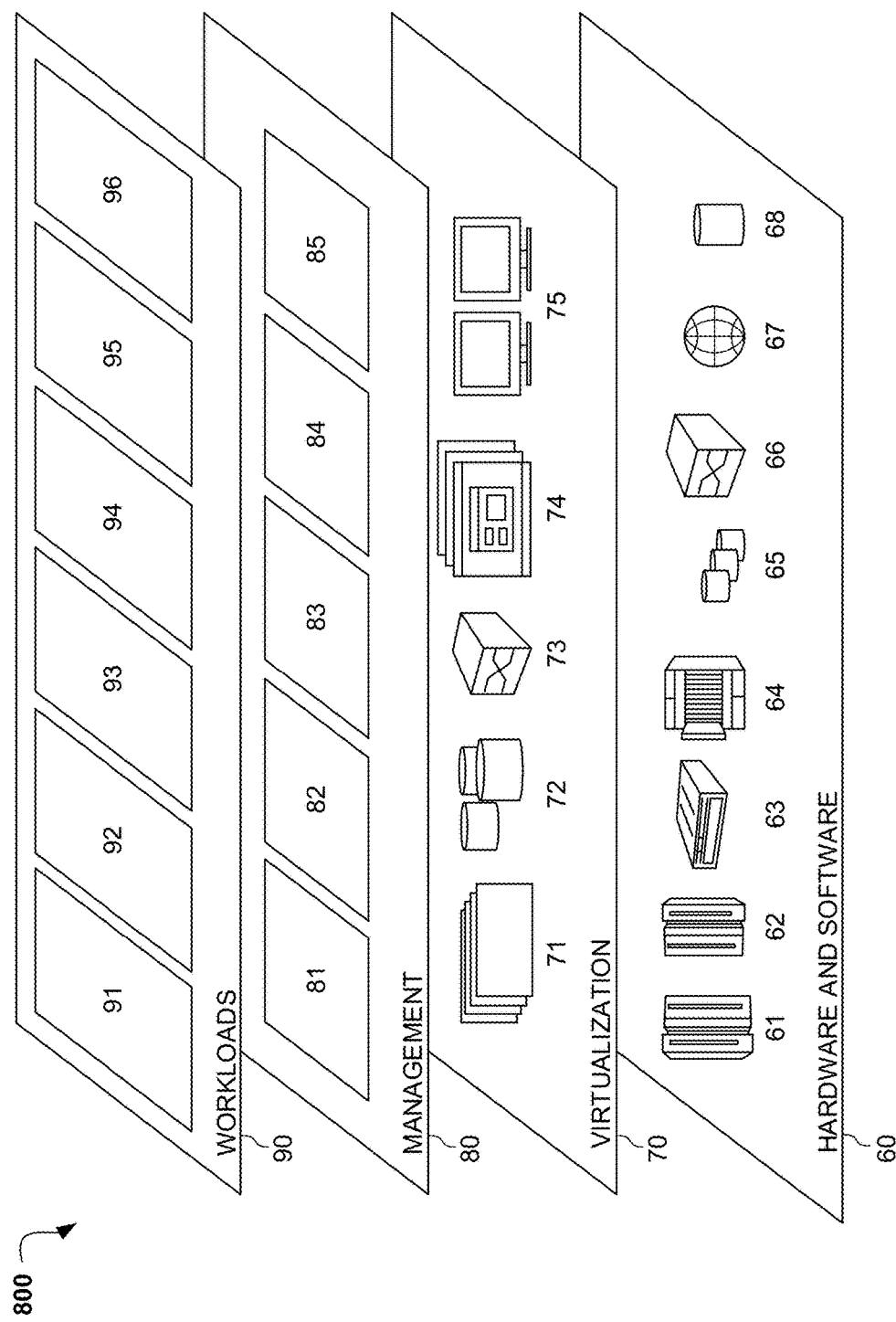
FIG. 8 depicts abstraction model layers according to an embodiment of the present invention.

Referring now to FIG. 8, a set of functional abstraction layers 800 provided by cloud computing environment 50 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and object detection 96. Object detection 96 may relate to analyzing an image to identify one or more regions of the image that contain objects of interest by comparing a template image against the analyzed image.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for object detection, the method comprising:
   receiving a user input that specifies a plurality of first regions and one or more second regions in a template image, wherein the one or more second regions include one or more objects of interest;
   for each of the plurality of first regions, finding a third region in an image under detection corresponding to one of the plurality of first regions in the template image by matching the image under detection with the template image;
   computing a transformation function based on the matching from each of the plurality of first regions to its corresponding third region and a distance between two or more pairs of first regions; and
   applying the computed transformation function to the one or more second regions to localize one or more fourth regions in the image under detection for the object detection.

2. The method according to claim 1, wherein computing a transformation function comprises: computing the transformation function based on the matching from a subset of the first regions to a corresponding subset of the third regions when the number of the first regions are larger than one.

3. The method according to claim 2, wherein the subset of the first regions is selected based on a similarity between each of the first regions and its matched third region and a distance between each pair of the first regions.

4. The method according to claim 3, wherein a first region is selected into the subset of the first regions if the first region has a high similarity with its matched third region and exceeds a threshold distance from other first regions.

5. The method according to claim 1, wherein the one or more first regions are one or more points in the template image, and the third region is one point in the image under detection.

6. The method according to claim 5, wherein matching is selected from a group consisting of point matching and graph matching.

7. The method according to claim 1, wherein a first region and a corresponding third region have less variations in appearance compared with a second region and a corresponding fourth region.

8. A computer system for object detection, the computer system comprising:
   one or more processors;
   one or more computer-readable memories coupled to at least one of the one or more processors;
   a set of computer program instructions stored in the memory and executed by at least one of the one or more processors in order to perform actions of:
   receiving a user input that specifies a plurality of first regions and one or more second regions in a template image, wherein the one or more second regions include one or more objects of interest;
   for each of the plurality of first regions, finding a third region in an image under detection corresponding to one of the plurality of first regions in the template image by matching the image under detection with the template image;
   computing a transformation function based on the matching from each of the plurality of first regions to its corresponding third region and a distance between two or more pairs of first regions; and
   applying the computed transformation function to the one or more second regions to localize one or more fourth regions in the image under detection for the object detection.

9. The computer system according to claim 8, wherein computing a transformation function comprising: computing the transformation function based on the matching from a subset of the first regions to a corresponding subset of the third regions when the number of the first regions are larger than one.

10. The computer system according to claim 9, wherein the subset of the first regions is selected based on a similarity between each of the first regions and its matched third region and a distance between each pair of the first regions.

11. The computer system according to claim 10, wherein a first region is selected into the subset of the first regions if the first region has a high similarity with its matched third region and exceeds a threshold distance from other first regions.

12. The computer system according to claim 8, wherein the one or more first regions are one or more points in the template image, and the third region is one point in the image under detection.

13. The computer system according to claim 12, wherein the matching is selected from a group consisting of point matching and graph matching.

14. The computer system according to claim 8, wherein a first region and a corresponding third region have less variations in appearance compared with a second region and a corresponding fourth region.

15. A computer program product for object detection, the computer program product comprising a computer readable storage medium having program instructions embodied therewith, wherein the program instructions being executable by a device to cause the device to perform a method comprising:

receiving a user input that specifies a plurality of first regions and one or more second regions in a template image, wherein the one or more second regions include one or more objects of interest;

for each of the plurality of first regions, finding a third region in an image under detection corresponding to one of the plurality of first regions in the template image by matching the image under detection with the template image;

computing a transformation function based on the matching from each of the plurality of first regions to its corresponding third region and a distance between two or more pairs of first regions; and applying the computed transformation function to the one or more second regions to localize one or more fourth regions in the image under detection for the object detection.

16. The computer program product according to claim 15, wherein computing a transformation function comprising: computing the transformation function based on the matching from a subset of the first regions to a corresponding subset of the third regions when the number of the first regions are larger than one.

17. The computer program product according to claim 16, wherein the subset of the first regions is selected based on a similarity between each of the first regions and its matched third region and a distance between each pair of the first regions.

18. The computer program product according to claim 17, wherein a first region is selected into the subset of the first regions if the first region has a high similarity with its matched third region and exceeds a threshold distance from other first regions.

19. The computer program product according to claim 15, wherein the one or more first regions are one or more points in the template image, and the third region is one point in the image under detection.

20. The computer program product according to claim 15, wherein a first region and a corresponding third region have fewer variations in appearance compared with a second region and a corresponding fourth region.

* * * * *